United States Patent
Feola et al.

(10) Patent No.: US 9,527,995 B2
(45) Date of Patent: Dec. 27, 2016

(54) POLYESTER RESINS

(75) Inventors: Roland Feola, Graz (AT); Johann Gmoser, Graz (AT); Oliver Etz, Huenstetten (DE)

(73) Assignee: Allnex Austria GmbH, Werndorf (AT)

( * ) Notice: Subject to any disclaimer, the term of this patent is extended or adjusted under 35 U.S.C. 154(b) by 425 days.

(21) Appl. No.: 13/511,943

(22) PCT Filed: Nov. 22, 2010

(86) PCT No.: PCT/EP2010/067961
§ 371 (c)(1),
(2), (4) Date: Sep. 28, 2012

(87) PCT Pub. No.: WO2011/064177
PCT Pub. Date: Jun. 3, 2011

(65) Prior Publication Data
US 2013/0017333 A1    Jan. 17, 2013

(30) Foreign Application Priority Data

Nov. 26, 2009 (EP) .................................... 09177277

(51) Int. Cl.
| C08G 63/16 | (2006.01) |
| C08L 67/02 | (2006.01) |
| C08L 61/06 | (2006.01) |
| C08G 63/12 | (2006.01) |
| C08G 63/20 | (2006.01) |
| C08L 67/00 | (2006.01) |

(52) U.S. Cl.
CPC .............. *C08L 61/06* (2013.01); *C08G 63/12* (2013.01); *C08G 63/20* (2013.01); *C08L 67/00* (2013.01); *C08L 67/02* (2013.01)

(58) Field of Classification Search
CPC ..... C08L 2666/04; C08L 101/02; C08L 71/02; C08L 2666/18; C08L 2666/54; C08L 33/00; C08L 67/00; C08L 2666/34; C08L 63/00; C08L 67/07; C08L 67/02; C08L 2666/16; C08L 61/06; C08G 18/10; C08G 18/62; C08G 18/765; C08G 81/024; C08G 18/3255; C08G 59/04; C08G 63/12; C08G 63/20
USPC ........................................................ 528/302
See application file for complete search history.

(56) References Cited

U.S. PATENT DOCUMENTS

2003/0153640 A1 *  8/2003  Moens ................ C09D 167/02
                                                           522/65

FOREIGN PATENT DOCUMENTS

| CA | 2100493 A1 | 1/1994 |
| EP | 0579193 A1 | 1/1994 |
| EP | 1584667 A1 | 10/2005 |
| EP | 1584667 | * 12/2005 |
| EP | 1964898 A1 | 9/2008 |
| WO | WO-02055620 A2 | 7/2002 |

OTHER PUBLICATIONS

Pripol Dimer fatty acids in surface coatings, Uniqema, Nov. 26, 2006, pp. 1-24.*
Internet Archive for Pripol Dimer fatty acids in surface coatings, Uniqema, Nov. 26, 2006—page.*
International Search Report for PCT/EP2010/067961 mailed Feb. 15, 2011.

* cited by examiner

*Primary Examiner* — Ling Choi
*Assistant Examiner* — Gennadiy Mesh
(74) *Attorney, Agent, or Firm* — Drinker Biddle & Reath LLP

(57) ABSTRACT

A polyester AB is disclosed comprising moieties derived from di- or polyfunctional organic acid compounds A and moieties derived from di- or polyfunctional organic hydroxy compounds B, wherein the compounds A comprise "hard" acid compounds A1 selected from the group consisting of isophthalic acid, trimellithic acid anhydride, hexahydrophthalic acid, cyclohexane-1,4-dicarboxylic acid, and tetrahydrophthalic acid, and soft acid compounds A2 selected from the group consisting of adipic acid, dimer fatty acids, and sebacic acid, and the compounds B comprise "hard" hydroxyfunctional compounds selected from the group consisting of trimethylolpropane, 1,2-bishydroxymethyl cyclohexane, and 1,2-dihydroxy-propane, and soft hydroxyfunctional compounds B2 selected from the group consisting of 1,4-butanediol, 1,6-hexanediol, 2,2'-dihydroxydiethyl ether, and 1,2-bis(2-hydroxypropoxy)-propane, and coating compositions prepared from this polyester together with crosslinkers selected from the group consisting of isocyanates, capped isocyanates, aminoplast crosslinkers, and phenoplast crosslinkers, as well as their application in coating of metal substrates.

11 Claims, No Drawings

POLYESTER RESINS

CROSS-REFERENCE TO RELATEDE APPLICATIONS

This application is a national stage application (under 35 U.S.C.§371)of PCT/EP2010/067961, filed Nov. 22, 2010, which claims benefit of European Application No. 09177277.2, filed Nov. 26, 2009.

The present invention relates to polyester resins, a process for their preparation, and a method of use thereof. Particularly, it relates to polyester resins having hard and soft segments, made from educts (starting products) that comprise both flexible and bulky, inflexible educts. The invention also relates to mixtures of phenolic resins and these polyesters.

Polyester resins have been known in the polymer field for a long time. They are characterised by the repeating units

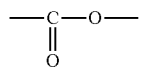

in the polymer chain which is commonly referred to as an ester bond or ester linkage. Polyesters are generally prepared from polyfunctional acids, particularly carboxylic acids, and polyfunctional hydroxy compounds, particularly alcohols or phenols, in a condensation or polyesterification process, under formation of water if acids and hydroxy functional compounds are used as educts.

Reacting acids and alcohols entails formation of water and of the desired polyester, in a condensation process. Polyesters can also be prepared by ring-opening polyaddition of cyclic esters (lactones), or by reacting more reactive derivatives of the said acids and hydroxy compounds, such as acid halides, acid anhydrides, or esters of acids with volatile alcohols such as methanol, or esters of acids with enols such as isopropenyl alcohol that form aldehydes or ketones upon transesterification.

For use in resins, low molar mass polyesters with a molar mass of less than 10 kg/mol are used particularly in the synthesis of polyurethanes (mainly linear or only slightly branched hydroxyfunctional polyesters), or as alkyd resins (from di- and poly-functional alcohols, mainly aromatic di- or polyfunctional acids, and saturated and/or unsaturated fatty acids). These polyesters may be air-drying (alkyd resins based on unsaturated fatty acids), or can be cross-linked by addition of suitable crosslinkers that are polyfunctional or at least difunctional, and that react with reactive groups of the polyester, mainly hydroxyl groups that do not take part in the polyesterification or polycondensation reaction.

Another important class of polyester resins are unsaturated polyesters which copolymerise with other olefinically unsaturated compounds such as styrene and esters of (meth) acrylic acid. These polyesters are preferably of low molar mass, and can be cured by radically initiated polymerisation, which may be induced thermally, by heating or, by exposure to high energy such as UV light or other radiation. High molar mass polyesters, particularly polyethylene terephthalate and polybutylene terephthalate, are used as thermoplastic polymers, for use in injection moulding compounds, or as thermoplastic (mostly polyethylene terephthalate) fibres.

Common educts (starting materials) for the synthesis of predominantly linear aliphatic polyester resins are adipic acid and also, to a lesser extent, other aliphatic dicarboxylic acids such as succinic and glutaric acids, and the so-called dimeric acids made from unsaturated fatty acids by dimerisation, and also, hydroxycarboxylic acids having one hydroxyl group and one carboxyl group, such as 6-hydroxycaproic acid, 5-hydroxyvaleric acid, 4-hydroxybutyric acid, and lactic acid. Aromatic acids such as isophthalic acid and its other isomers are sometimes added as modifiers. Trifunctional or higher functional acids are used, mostly in mixture with difunctional acids, to impart branching to the polyesters formed. The mass fraction of these higher functional acid educts in the total mass of acid educts must be limited in order to avoid formation of highly crosslinked, and hence, brittle structures.

As hydroxyl components, ethylene glycol, diethylene glycol, 1,2-propane diol, 1,3- and 1,4-butane diol, neopentyl glycol and 1,6-hexane diol are the most common compounds; branched polyesters are made by use of polyfunctional alcohols such as glycerol, trimethylol ethane, trimethylol propane, and the isomeric hexane triols, usually in combination with the afore-mentioned dihydric alcohols. As mentioned supra for the acids, the mass fraction of higher functional hydroxy compounds must also be limited. It is also possible to utilise etheralcohols such as dihydroxy oligo-ethylene glycol or dihydroxy poly-ethylene glycol or dihydroxy oligo-propylene glycol or dihydroxy poly-propylene glycol or the corresponding compounds having oxybutylene units, or mixtures of two or more different oxyalkylene units, as hydroxy compounds which usually further enhances the flexibility of the polyesters comprising moieties from these compounds.

While polyesters that are based predominantly on flexible monomers such as linear aliphatic alcohols and linear aliphatic acids are usually flexible, but soft, polyesters based on aromatic moieties or on cycloaliphatic moieties or on highly branched aliphatic moieties are usually hard and brittle.

Neither of these provide the needed balance of impact resistance and adhesion, both associated with flexibility, that is desired in coating films on substrates such as metals or plastics, if the coated substrates are subjected to postforming such as cupping, deep-drawing, and bending. The same combination is also needed in plastic coating if such coated parts are subjected to chipping, or impact, during their application.

It has been found in the course of the investigations that have led to the present invention that combinations of "hard" and "soft" monomers in at least one class, acid-functional and hydroxy functional, educts of a polyester provides a polyester having both good elasticity and impact resistance, and good adhesion, and also, sufficient hardness against abrasion and indentation.

It is therefore an object of the invention to provide a polyester AB comprising moieties derived from di- or polyfunctional acids A and moieties derived from di- or polyfunctional hydroxy compounds B, wherein the acids A comprise an amount of substance-fraction $a_1$ of from $a_{11}$ to $a_{12}$ of at least one hard acid A1 as further defined hereinbelow, and an amount of substance-fraction $a_2$ of from $a_{21}$ to $a_{22}$ of at least one soft acid A2, and/or wherein the hydroxy functional compounds B comprise an amount of substance-fraction $b_1$ of from $b_{11}$ to $b_{12}$ of at least one hard hydroxy functional compound B1 as further defined hereinbelow, and an amount of substance-fraction $b_2$ of from $b_{21}$ to $b_{22}$ of at least one soft hydroxy functional compound B2, wherein at least three of $a_{11}$, $a_{21}$, $b_{11}$, and $b_{21}$ are greater than 0, and wherein the sum of $a_1$ and $a_2$ is 1, and the sum of $b_1$ and $b_2$ is 1. An amount-of substance fraction $x_k$ is defined as usual as the ratio of the amount of substance $n_k$ of a component k in a mixture, and the sum $n_\Sigma$ of the amounts of substance of all components in that mixture (here, mixture of acids A on the one hand, and mixture of hydroxy compounds B on the other hand). For the purpose of the present invention, at least three of $a_{11}$, $a_{21}$, $b_{11}$, and $b_{21}$ are greater than 0.

The terms "hard", bulky, inflexible, and "soft" or flexible are defined as follows for the purpose of the instant patent application:

the group A1 of "hard" acid compounds includes organic diacid compounds having two acid groups per molecule, and organic polyacid compounds having three or more acid groups per molecule, where
- at least two acid groups are attached to neighbouring tertiary carbon atoms of an aliphatic molecule, neighbouring meaning that these carbon atoms are directly bonded to each other, or
- at least two acid groups are attached to the same aromatic moiety or to the same cycloaliphatic or polycyclic aliphatic moiety in an aromatic or (poly)cycloaliphatic compound, and the group A2 of "soft" acid compounds includes all such organic diacid compounds having two acid groups per molecule, and organic polyacid compounds having three or more acid groups per molecule which compounds are not members of group A1, where the acid groups are selected from the group consisting of carboxyl groups —COOH, sulphuric acid groups —O—SO$_2$—OH, sulphonic acid groups —SO$_2$—OH, sulphinic acid groups —SO—OH, phosphoric acid groups —O—PO(OH)$_2$, phosphonic acid groups —PO(OH)$_2$, and phosphinic acid groups —P(OH)$_2$, and where two neighbouring acid groups, i. e. such acid groups that are bound to carbon atoms directly bonded to each other, may be partly or wholly replaced by the corresponding acid anhydride group, and the group B1 of "hard" hydroxyfunctional compounds includes organic dihydroxy compounds having two hydroxyl groups per molecule and organic polyhydroxy compounds having three or more hydroxyl groups per molecule, where
- at least two hydroxymethyl or hydroxyaryl groups are attached to neighbouring tertiary or quaternary carbon atoms of an aliphatic molecule, neighbouring meaning that these carbon atoms are directly bonded to each other, or
- at least two hydroxyl groups are attached to the same aromatic moiety or to the same cycloaliphatic or polycyclic aliphatic moiety in an aromatic or (poly)cycloaliphatic compound, and the group B2 of "soft" hydroxyfunctional compounds includes all such organic dihydroxy compounds having two hydroxyl groups per molecule and organic polyhydroxy compounds having three or more hydroxyl groups per molecule which compounds are not members of group B1.

A "hydroxymethyl" group is for the purpose of this invention a group of formula

—CH$_2$—OH, where one or both of the hydrogen atoms shown may be substituted by groups $R^3$ and $R^4$ as defined infra.

A tertiary carbon atom is defined for the purpose of this invention as a carbon atom having only one hydrogen atom directly bonded to it, a quaternary carbon atom is a carbon atom having no hydrogen atom directly bonded to it.

An aromatic moiety is defined for the purpose of this invention as a single aromatic ring, or two or more aromatic rings that share carbon atoms, such as naphthalene, anthracene, perylene and pyrene, or are directly bonded to each other, such as diphenyl or dinaphthyl, or are bonded to each other by a group selected from —CR$^3$=CR$^4$—, —C≡C—, —C(R$^1$R$^2$)— where neither $R^1$ nor $R^2$ are hydrogen, and $R^3$ and $R^4$ can be hydrogen or (oxy)alkyl or (oxy)aryl or mixed (oxy)alkyl-aryl, where (oxy) means that any methylene group may be substituted by oxygen, wherein two oxygen atoms my nor be immediately adjacent to each other.

Examples for "hard" hydroxyfunctional compounds B1 are resorcinol, hydroquinone, 1,2-, 2,3-, 1,4-, 1,5-, 2,6- and 1,8-dihydroxynaphthalene, 1,2-propylene glycol, 1,2-dihydroxy butane, neopentyl glycol, 2,2,4-trimethylpentane diol-1,3, and 1,2-dihydroxycyclohexane. Hard tri-or polyhydroxy compounds are, e. g., pentaerythritol, trimethylol ethane, trimethylol propane, and trimethylol butane. Other hard aliphatic dihydroxy or polyhydroxy compounds are di-or polyhydroxy polycyclic compounds and di-or polyhydroxy unsaturated cyclic or polycyclic compounds, such as dihydroxy bornane or dihydroxy norbornane, and bishydroxymethylnorbornene.

Examples of "hard" diacid compounds A1 are maleic acid, fumaric acid, itaconic, citraconic and mesaconic acids, 2,3-dimethylsuccinic acid, tetra- and hexahydrophthalic acid and isomers of these. Hard tri-or polyacid compounds are monocyclic or polycyclic aliphatic acids, such as hexahydrotrimesic acid, and also aromatic acids such as trimellithic acid and trimesic acid, and naphthalene-1,4,5,8-tetracarboxylic acid.

In a preferred embodiment, both acid component and hydroxy component comprise each of at least one hard and at least one soft compound.

The limits $a_{11}$, $a_{12}$, $a_{21}$, $a_{22}$, $b_{11}$, $b_{12}$, $b_{21}$, and $b_{22}$ of the of the amount-of-substance fractions $a_1$, $a_2$, $b_1$, and $b_2$ of components A1, A2, B1, and B2 preferably obey the following rules:

| | $a_{11}$ | $a_{12}$ | $a_{21}$ | $a_{22}$ | $b_{11}$ | $b_{12}$ | $b_{21}$ | $b_{22}$ |
|---|---|---|---|---|---|---|---|---|
| $\forall(a_i; b_i) \neq 0$ | 0.2 | 0.8 | 0.2 | 0.8 | 0.05 | 0.8 | 0.2 | 0.95 |
| $a_1 = 0$ | | | 1 | 1 | 0.1 | 0.6 | 0.4 | 0.9 |
| $a_2 = 0$ | 1 | 1 | | | 0.05 | 0.7 | 0.3 | 0.95 |
| $b_1 = 0$ | 0.3 | 0.95 | 0.05 | 0.7 | | | 1 | 1 |
| $b_2 = 0$ | 0.05 | 0.7 | 0.3 | 0.95 | 1 | 1 | | | where the conditions mean:

| | |
|---|---|
| 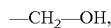 $\forall(a_i; b_i) \neq 0$ | neither of $a_1$, $a_2$, $b_1$, and $b_2$ is zero |
| $a_1 = 0$ | only $a_1$ is zero, the other $a_2$, $b_1$, and $b_2$ are all different from zero |
| $a_2 = 0$ | only $a_2$ is zero, the other $a_1$, $b_1$, and $b_2$ are all different from zero |
| $b_1 = 0$ | only $b_1$ is zero, the other $a_1$, $a_2$, and $b_2$ are all different from zero |
| $b_2 = 0$ | only $b_2$ is zero, the other $a_1$, $a_2$, and $b_1$ are all different from zero. |

An amount-of substance fraction has the unit 1, or mol/mol.

In a preferred embodiment, in the polyester AB, at least three of $a_{11}$, $a_{21}$, $b_{11}$, and $b_{21}$ are at least 5 cmol/mol.

In a further preferred embodiment, in the polyester AB, at least one compound A1 and at least one compound A2 are present, and the ratio of $a_1$ to $a_2$ is from 0.2 to 5.

In a further preferred embodiment, in the polyester AB, at least one compound B1 and at least one compound B2 are present, and the ratio of $b_1$ to $b_2$ is from 0.04 to 2.

In a further preferred embodiment, in the polyester AB, at least one compound B1 and at least one compound B2 are present, and the ratio of $b_1$ to $b_2$ is from 0.06 to 1.5.

In a further preferred embodiment, in the polyester AB, at least two compounds according to A1 are present.

In a further preferred embodiment, in the polyester AB, at least two compounds according to A2 are present.

In a further preferred embodiment, in the polyester AB, at least two compounds according to B1 are present.

In a further preferred embodiment, in the polyester AB, at least two compounds according to B2 are present.

If there is no "soft" acid component A2, but both "hard" B1 and "soft" B2 hydroxy compounds in the hydroxy component, it is preferred to use at least two "hard" acid compounds A11 and A12, preferably in a molar ratio of from 3 mol:1 mol to 1 mol:3 mol. Analogously, if there is no "soft" hydroxy component B2, but both "hard" A1 and "soft" A2 acids in the acid component, it is preferred to use at least two "hard" hydroxy compounds B11 and B12, preferably in a molar ratio of from 3 mol:1 mol to 1 mol:3 mol.

It is not needed for the purpose of the present invention that the properties of "hard" and "soft" show as distinctive glass transition temperatures on a macroscopic scale, it is usually sufficient and preferred to have ranges of mass fractions of from 5% to 95% of hard, and from 95% to 5% of soft hydroxy compounds and acids, where the lower boundary preferably rises to at least 7.5%, and the upper boundary to not more that 92.5% if only one class of educts, hydroxy or acid functional educts, are present in the educt mixture as "hard" and "soft". The same applies, of course, for educts that have both types of functionalities, hydroxy and acid.

The polyesters of the present invention have a good flexibility, yet also a good hardness, and are therefore well suited to be used in films and coatings; while the latter shows as good chemical and mechanical resistance, as well as excellent film hardness after curing or solidification, the flexibility imparts toughness and resilience to the film or coating. It is the combination of hardness and flexibility, however, that leads to the desirable properties of quick development of hardness, and impact resistance, of the film or coating.

It could not have been expected that combination of hard and soft segments in a polyester resin would lead to this favourable combination of physical properties.

The polyesters AB can be prepared by the conventional processes used for polyesterification, preferably in a reaction where di- or polyfunctional organic acid compounds A and di- or polyfunctional organic hydroxy compounds B are mixed and heated preferably under a nitrogen blanket, and also preferably, under reduced pressure, to eliminate water formed in the polyesterification reaction. It is also possible to use entrainment agents such as xylene or other non-water-miscible organic solvents, which form an azeotrope with water, and condensing the vapours formed, separating the water, and recirculating the entrainment agent. Catalysts can also be used to accelerate the polyesterification reaction, such as the conventional tin catalysts, while it is preferable for food contact to use catalysts based on Mg, Ca, Zn, and Ti. It is preferable when using catalysts to mix the hydroxy-functional components B with the catalyst, and heat the mixture under inert gas to de-aerate, and then to add a mixture of the acid-functional components A and entrainment agent, and then to heat to the polyesterification temperature which is usually between 120° C. and 200° C. The reaction is continued until the desired degree of polycondensation is reached which is usually monitored by measuring the acid or hydroxyl number, or the viscosity, of a sample drawn from the reaction mixture. When the reaction is completed, the entrainment agent is distilled off, and the polyester is discharged as a melt, and subsequently solidified and crushed, or preferably formed to pellets on a cooling belt, or dissolved in an appropriate solvent, mostly aliphatic ether alcohols or mixtures of these, such as methoxypropanol or esters of ethylene glycol or diethylene glycol.

These polyesters can be used as binders for coating compositions. Their hydroxyl number is preferably in the range of from 50 mg/g to 400 mg/g, depending on the stoichiometry used. A preferred range is from 80 mg/g to 350 mg/g. Their acid number is from 1 mg/g to 70 mg/g, preferably from 2 mg/g to 60 mg/g. Theses polyesters can be cured with curing agents commonly used in combination with hydroxy-functional binder resins such as polyfunctional isocyanates, capped polyfunctional isocyanates, aminoplast crosslinkers, and phenoplast crosslinkers.

The coating compositions prepared therefrom can be used on a plethora of substrates, such as metals, thermoplastic materials, reinforced thermoplastic materials, and thermosets which are duroplastic materials, reinforced thermosets, glass, and mineral substrates, reinforcement agents being natural or man-made fibres, glass beads, mineral fillers, wood flour, or combinations thereof, preferred being metals where they show excellent adhesion.

It has also been found in the experiments which have led to the present invention that the polyesters of the present invention can preferably be mixed with phenolic resins to provide binders for metal coatings, particularly for can coating, i. e. coating on the inside of cans.

Such coatings have hitherto mainly been made from mixtures of phenolic resins and epoxy resins. Objections have been raised since against the use of epoxy resin in connection with food due to their contamination with residual monomers, particularly the digylcidyl ether of bisphenol A, also known as "BADGE". It has been proposed, in EP 1 584 667 A1, to provide mixtures of phenolic resins with branched carboxy-functional polyesters. Although devoid of BADGE and BADGE-derived products, it has been found that these systems still need improvement with regard to sterilisation resistance and sulphur staining.

This object has been achieved by providing mixtures based on the polyester resins AB of the present invention with phenolic resins C.

These mixtures are preferably made by admixing to the said polyester AB a phenolic resin C in a range of mass ratios of m(AB):m(C) of from 50:95 to 50:5.

Phenolic resins C which may preferably be used for the invention are resols, particularly etherified resols obtained by reaction of phenols or mixtures or more than one phenol having at least one hydrogen atom in the aromatic nucleus in ortho or para position to the hydroxyl group(s) with aldehydes, particularly formaldehyde, by alkaline catalysis, and which are subsequently at least partially etherified under acidic conditions with linear or branched alcohols, particularly methanol and n- or iso-butanol. Especially preferred are resols etherified with n- or iso-butanol having a mass fraction of at least 20% of cresol-derived constituents.

Partially etherified resols are understood to be, in the context of the present invention, those resols where at least 20% of their hydroxymethyl groups are etherified with the said aliphatic alcohols.

The polyesters AB are mixed with the phenolic resins C and optionally, customary additives such as levelling agents, crosslinking catalysts, and solvents to yield coating compositions. The coating compositions thus obtained are preferentially used for the coating of metallic substrates, particularly for interior coating of metal containers, such as preferably those that are used as food containers. These coating compositions are preferably applied to a metal surface by spraying, dipping, brushing, blade coating, or roller coating, and cured by stoving the coated substrate at a temperature of from 100° C. to 250° C. After stoving, yellow or gold films are formed which have excellent adhesion to the metal substrate even upon mechanical stress, and good resistance against the usual charges.

The invention is further illustrated by the following examples which are not to be construed as limiting.

EXAMPLES

The following definitions are used herein:

The hydroxyl number is defined according to DIN EN ISO 4629 (DIN 53 240) as the ratio of the mass of potassium hydroxide $m_{KOH}$ having the same number of hydroxyl groups as the sample, and the mass $m_B$ of that sample (mass of solids in the sample for solutions or dispersions); the customary unit is "mg/g".

The acid number is defined, according to DIN EN ISO 3682 (DIN 53 402), as the ratio of that mass $m_{KOH}$ of potassium hydroxide which is needed to neutralise the sample under examination, and the mass $m_B$ of this sample, or the mass of the solids in the sample in the case of a solution or dispersion; its customary unit is "mg/g".

Example 1

Synthesis of Polyester 1

A mixture was made of 6.7 g of trimethylol propane, 49.6 g of 1,6-hexane diol, and 46.7 g of adipic acid. The mixture was heated under a nitrogen blanket to 150° C. under reduced pressure of 25 hPa, and the water formed was distilled off. After one hour, the temperature was increased to 180° C., and reaction was continued for further two hours. A total of 92 g of water had been collected. A sample drawn from the reaction mixture had a hydroxyl number of 213 mg/g, and an acid number of 4 mg/g. The resulting polyester was poured onto a steel tray to solidify and then crushed. The same acid and hydroxyl numbers were found for the resulting polyester.

Example 2

Synthesis of Polyesters 2 to 9

The procedure of Example 1 was repeated, with the educts (reactants) of Table 1. The following abbreviations are used:

| | | | |
|---|---|---|---|
| TMP | 1,1,1-tris-hydroxymethyl propane | THP | tetrahydrophthalic anhydride |
| CHM | 1,2-bis-hydroxymethyl cyclohexane | | |
| PG | 1,2-dihydroxypropane | HHP | hexahydrophthalic anhydride |
| NPG | 2,2-bis-hydroxymethylpropane | | |
| HD | 1,6-dihydroxyhexane | CHA | cyclohexane-1,4-dicarboxylic acid |
| DEG | 2,2'-dixydroxydiethyl ether | | |
| BD | 1,4-dihydroxy butane | ADA | adipic acid |
| TPG | 1,2-bis(2-hydroxypropoxy)propane, "tripropylene glycol" | DMA | dimeric fatty acid (molar mass: 630 g/mol; acid number: appr. 192 mg/g) |
| IPA | isophthalic acid | | |
| TMA | trimellithic anhydride | | |
| | | SBS | sebacic acid |

TABLE 1

Polyesters 2 to 9

| | | Polyester | | | | | | | | |
|---|---|---|---|---|---|---|---|---|---|---|
| | | 2 | 3 | 4 | 5 | 6 | 7 | 8 | 9 | 10 | 11 |
| "hard" OH | m/g | 6.7 | 93.6 | 28.8 | 28.8 8.0 | 25.8 13.4 | 13.4 | 13.4 20.8 | 6.7 | | 72 |
| | n/mmol | 50 | 650 | 200 | 200 60 | 340 100 | 100 | 100 200 | 50 | | 500 |
| | kind | TMP | TMP | CHM | CHM TMP | PG TMP | TMP | TMP PG | TMP | | CHM |
| "soft" OH | m/g | 49.6 | | 10.6 19.8 | 19.8 19.2 | 118 | 76.8 70.8 | 94.4 | 153.6 | 59.0 | |
| | n/mmol | 420 | | 100 200 | 220 100 | 1000 | 400 600 | 800 | 800 | 500 | |
| | kind | HD | | DEG BD | BD TPG | HD | TPG HD | HD | TPG | HD | |
| "hard" acid | m/g | 53.1 | 19.2 | 26.6 19.2 | 15.4 33.2 | 27.5 26.6 | 16.6 22.8 | 16.6 34.4 | 9.6 24.9 | | 58.1 |
| | n/mmol | 320 | 100 | 160 100 | 100 200 | 160 160 | 100 150 | 100 200 | 50 150 | | 350 |
| | kind | IPA | TMA | IPA TMA | HHP IPA | CHA IPA | IPA THP | IPA CHA | TMA IPA | | IPA |
| "soft" acid | m/g | | 46.7 | 23.3 | 23.3 | 56.0 118 | 40.4 87.6 | 121.2 56.0 | 21.9 60.6 | 51.1 | |
| | n/mmol | | 320 | 160 | 160 | 100 800 | 200 600 | 600 100 | 150 300 | 350 | |
| | kind | | ADA | ADA | ADA | DFA ADA | SBA ADA | SBA DFA | ADA SBA | ADA | |

TABLE 1-continued

Polyesters 2 to 9

| | | Polyester | | | | | | | | | |
|---|---|---|---|---|---|---|---|---|---|---|---|
| | | 2 | 3 | 4 | 5 | 6 | 7 | 8 | 9 | 10 | 11 |
| Water | m/g | 98 | 144 | 113 | 139 | 342 | 293 | 325 | 254 | 98 | 118 |
| OH number | mg/g | 200 | 151 | 99 | 161 | 105 | 76 | 86 | 132 | 177 | 147 |
| Acid number | mg/g | 4 | 5 | 49 | 40 | 10 | 9 | 34 | 44 | 6 | 5 |

Example 3

Coating Test

Coating compositions CC1 to CC11 were prepared from polyesters 1 to 11, dissolved in ethylene glycol monobutyl ether to a mass fraction of solids of 60%, and the phenol resin of Example 2 of EP 1 964 898 A1, with a mass ratio of polyester resin to phenol resin of 70 g/30 g in all cases. 26 g of the polyester solution, 11 g of the phenol resin solution together with 0.45 g of phosphoric acid and 0.13 g of a catalyst (amine neutralised dodecylbenzene sulphonic acid, ®Nacure 5925, King Industries) were diluted with 12 g of methoxypropanol to a clear solution having a mass fraction of solids of 45%. This solution was bar coated on sheets made of cold rolled steel (40 µm wet film thickness), and cured at 200° C. for twelve minutes.

The data which have been measured on these coatings are summarised in table 2.

TABLE 2

Results of Coating Tests

| | Coating Composition | | | | | | | | | | |
|---|---|---|---|---|---|---|---|---|---|---|---|
| | CC1 | CC2 | CC3 | CC4 | CC5 | CC6 | CC7 | CC8 | CC9 | CC10 | CC11 |
| Pendulum Hardness in s | 130 | 145 | 155 | 160 | 140 | 170 | 155 | 145 | 140 | 70 | 195 |
| Impact in in · lb (J) | 50 (5.7) | 40 (4.5) | 55 (5.7) | 70 (7.9) | 70 (7.9) | 80 (9.0) | 75 (8.5) | 80 (9.0) | 70 (7.9) | 85 (9.6) | 10 (1.1) |
| Erichsen Cupping in mm | 8 | 5 | 4 | 8 | 8 | 10 | 8 | 8 | 8 | 10 | 3 |
| Crosshatch Test | 2 . . . 3 | 2 | 2 . . . 3 | 0 . . . 1 | 0 | 0 | 0 | 0 | 0 . . . 1 | 0 | 4 |
| MEK double rubs | 95 | 120 | 130 | 150 | 150 | 150 | 150 | 150 | 150 | 30 | 40 |

Pendulum hardness was determined according to the method of König, DN 53 157. Impact energy was determined according to ISO 6272, measured in "in×lb" and converted to the SI unit, J (1 in×lb=113 mJ), Erichsen cupping was measured according to DIN 53 156. Crosshatch test was done according to DIN EN ISO 2409, rated between 0 and 5, 0 being the best value. MEK double rubs were determined according to ASTM D 5402, using methyl ethyl ketone as solvent.

It can be seen that if both acid and hydroxy component comprise a hard and a soft portion, the best balance of hardness and elasticity is obtained, as well as the best corrosion (cross hatch test) and solvent resistance (MEK double rubs). A mixture of hard and soft portions in just one component (CC1 to CC3) shows still better behaviour than with a polyester of only hard moieties (CC11) or only soft moieties (CC10).

The invention claimed is:

1. A polyester AB consisting of moieties derived from di-or polyfunctional organic acid compounds A and moieties derived from di- or polyfunctional organic hydroxy compounds B, wherein A consists of an amount of substance-fraction $a_1$ of from 0.2 to 0.8 of at least two acid compounds A1, and an amount of substance-fraction $a_2$ of from 0.2 to 0.8 of at least two acid compounds A2, and wherein the compounds B consist of an amount of substance-fraction $b_1$ of from 0.05 to 0.8 of at least one hydroxy functional compound B1, and an amount of substance-fraction $b_2$ of from 0.2 to 0.95 of at least one hydroxy functional compound B2, wherein the sum of the amount of substance fractions $a_1$ and $a_2$ is 1, and the sum of the amount of substance fractions $b_1$ and $b_2$ is 1, and wherein:
A1 are independently selected from the group consisting of isophthalic acid, trimellithic acid anhydride, hexahydrophthalic acid, cyclohexane-1,4-dicarboxylic acid, and tetrahydrophthalic acid, and
A2 are independently selected from the group consisting of adipic acid, dimer fatty acids, and sebacic acid, and
B1 are independently selected from the group consisting of trimethylolpropane, 1,2-bishydroxymethyl cyclohexane, and 1,2-dihydroxy-propane, and
B2 are selected from the group consisting of 1,4-butanediol, 1,6-hexanediol, 2,2'-dihydroxydiethyl ether, and 1,2-bis(2-hydroxypropoxy)propane.

2. The polyester AB of claim 1 wherein the ratio of $b_1$ to $b_2$ is from 0.05:0.95 to 2:1.

3. The polyester AB of claim 1 wherein the ratio of $b_1$ to $b_2$ is from 0.06 to 1.5.

4. The polyester AB of claim 1 wherein two compounds according to A2 are present.

5. The polyester AB of claim 1 wherein at least two compounds according to B1 are present.

6. The polyester AB of claim 2 wherein at least two compounds according to B2 are present.

7. The polyester AB of claim 2 wherein two compounds according to A1, referred to as A11 and A12 are present.

8. The polyester AB of claim 7 wherein the two compounds A11 and A12 are present in a molar ratio of from 3 mol : 1 mol to 1 mol : 3 mol.

9. The polyester AB of claim 1 wherein two compounds according to B1, referred to as B11 and B12 are present.

10. The polyester AB of claim 9 wherein the two compounds B11 and B12 are present in a molar ratio of from 3 mol : 1 mol to 1 mol : 3 mol.

11. A method of use of the polyester AB of claim 1 for manufacturing coatings, comprising the steps of
   admixing to the said polyester AB a phenolic resin C in a range of mass ratios of m(AB):m(C) of from 50:95 to 50:5 to provide a mixture,
   applying the mixture to a metal surface by spraying, dipping, brushing, blade coating, or roller coating, and
   curing the coated substrate at a temperature of from 100° C. to 250° C.

\* \* \* \* \*